United States Patent [19]

Umemura et al.

[11] Patent Number: 4,914,925
[45] Date of Patent: Apr. 10, 1990

[54] CONTROL DEVICE FOR AN AIR CONDITIONER

[75] Inventors: Hiroyuki Umemura; Kenji Matsuda; Tetsuji Okada; Hidenori Ishioka; Katsuyuki Aoki, all of Shizuoka, Japan

[73] Assignee: Mitsubishi Denki Kabushiki Kaisha, Tokyo, Japan

[21] Appl. No.: 302,342

[22] Filed: Jan. 27, 1989

[30] Foreign Application Priority Data

Jan. 27, 1988 [JP] Japan .................................. 63-16240

[51] Int. Cl.⁴ ............................................. F25B 13/00
[52] U.S. Cl. ..................................... 62/160; 165/11.1; 165/26
[58] Field of Search .................. 62/160; 165/11.1, 26; 236/94

[56] References Cited

U.S. PATENT DOCUMENTS 4,682,279 7/1987 Watabe .............................. 165/26 X
4,715,191 12/1987 Umemura et al. ..................... 62/208

FOREIGN PATENT DOCUMENTS 56-45768 10/1981 Japan .

Primary Examiner—William E. Wayner
Attorney, Agent, or Firm—Oblon, Spivak, McClelland, Maier & Neustadt

[57] ABSTRACT

A control device for an air conditioner operable in the heating and cooling operation mode is disclosed, which device comprises a "too hot" and a "too cold" switch which is operated by the user when he feels that it is too hot or too cold in the room conditioned by the air conditioner. When a first operation of one of these switches by the user takes place, a mode selector automatically selects the operation mode of the air conditioner, and the control of the air conditioner is started immediately. The setting or target temperature is automatically renewed every time a further operation of one of the switches is made, so that the target temperature may be adjusted to the individual preference of the user. The fan speed of the air conditioner may also be modified according to the frequency of inputs through the switches.

13 Claims, 19 Drawing Sheets

CONTROL DEVICE FOR AN AIR CONDITIONER

BACKGROUND OF THE INVENTION

1. Field of the Invention

This invention relates to control devices for air conditioners, and more particularly to devices which are capable of providing a comfortable environment adapted to the preference of individual users.

2. Description of the Prior Art

In small self-contained air conditioners, both the cooling and warming of air are effected by means of a heat pump driven by a compressor. In the cooling operation, the air cooled by the expansion of the refrigerant gas in the evaporator is delivered to the room; in the heating or warming operation, the direction of circulation of the refrigerant is changed over, and the air warmed by the condensation of the refrigerant is delivered to the room. These types of air conditioners are often installed to condition the air of a single room; hence, it is preferable to control them according to the varying preference of individual users. However, the control of such air conditioners is usually effected according to a fixed standard which can not be adapted to individual preferences or conditions of users.

FIGS. 1 and 2 show circuit diagrams of an air conditioner (a temperature and humidity control device) and its control circuit disclosed in the Japanese laid-open patent application No. 56-18236. As shown in FIG. 1, the circuitry of the temperature and humidity control device THC comprises a compressor CM, motors for indoor and outdoor fans $FM_1$ and $FM_2$, a valve $SV_1$ for dehumidifying operation cycle, and a valve $SV_2$ for a cooling operation cycle. When the cooling operaton is performed, the switch RY-1-S (interlocked to the relay RY-1 shown in FIG. 2) is made to the side of the contact point NC; when, on the other hand, the slightly warming dehumidifying operation is performed, it is made to the side of the contact point NO. The relay RY-1 itself is operated by the control circuit shown in FIG. 2.

The control circuit of FIG. 2 comprises a temperature detecting circuit, a humidity detecting circuit, and a circuit for driving the relay RY-1 according to the detected temperature and humidity. In the following, these circuits are described in the above order.

The temperature detecting circuit in the control circuit of FIG. 2 comprises a temperature detector TD, a Zener diode $ZD_1$ for giving a reference voltage $v_2$ corresponding to a reference temperature, an operational amplifier $IC_1$ for subtracting the reference voltage $v_2$ given by the Zener diode $ZD_1$ from the detected voltage $v_1$ outputted from the temperature detector TD. Since the resistance of the temperature detector TD has a negative temperature characteristic and a constant voltage $+V_1$ is applied across the voltage divider consisting of the temperature detector TD and the resistor $R_1$, the voltage $v_1$ becomes increasingly higher as the temperarure rises. The detected voltage $v_1$ is applied to the noninverting input terminal of the operational amplifier $IC_1$ through the resistor $R_4$. On the other hand, the reference voltage $v_2$ is applied to the inverting input terminal thereof through the resistor $R_3$. Thus, the output voltage $v_3$ of the operational amplifier $IC_1$ having a feedback resistor $R_5$ across the output and the inverting input terminal thereof is expressed by the following equation:

$$v_3 = v_2 + (v_1 - v_2) \times (R_3 + R_5)/R_3 \qquad (1)$$
$$= v_1 \times (R_3 + R_5)/R_3 - v_2 \cdot (R_5/R_3).$$

Consequently, the output voltage $v_3$ of the operational amplifier $IC_1$ is proportional to the voltage $v_1$.

The humidity detecting circuit, on the other hand, comprises an oscillator circuit OSC, a humidity detector HD, and AC/DC converter circuit LEC for converting the detected AC voltage $v_4$ of the humidity detector HD into a DC voltage $v_5$. The oscillator circuit OSC is provided for the humidity detector HD, since the humidity detector HD of FIG. 2 is operated by an AC voltage; in cases where it is operated by a DC voltage, the direct voltage $+V_1$ may be applied thereto. The voltage $v_4$ detecting the humidity appears at the junction between the detector HD and the resistor $R_6$. Since the humidity detector HD has a negative resistance characteristic, the detected voltage $v_4$ becomes increasingly higher as the humidity rises. The AC voltage $v_4$ is converted into a DC voltage $v_5$ by the AC/DC converter circuit LEC.

The output voltages $v_3$ and $v_5$ of the temperature and humidity detecting circuits are applied across the voltage divider consisting of the serially connected resistors $R_7$ and $R_8$, thereby obtaining at the junction between the resistors a composite voltage $v_6$:

$$v_6 = (v_3 \cdot R_8 + v_5 \cdot R_7)/(R_7 + R_8), \qquad (2)$$

which is applied to the negative input terminal of a comparator circuit $IC_2$. A variable resistor $VR_1$ connected in series with a resistor $R_9$ gives a reference voltage $v_7$, which is applied to the positive input terminal of the comparator circuit $IC_2$ through a resistor $R_{10}$. A feedback loop consisting of a resistor $R_{11}$ and a diode $D_1$ is coupled between the output and the positive input terminal of the comparator circuit $IC_2$, so that the output $v_8$ thereof has a hysteresis characteristic. Namely, when the diode $D_1$ is in the non-conducting state, the reference voltage for the voltage $v_6$ given by equation (2) takes a first value $Vref_1$ corresponding to the comfort line Pa-Pa' shown in FIG. 3: the transistor $Q_1$, the base of which is coupled to the output of the comparator circuit $IC_2$ through a resistor $R_{12}$, is turned off at the time when the voltage $v_6$ given by equation (2) rises to a first reference voltage $Vref_1$ corressponding to the comfort line Pa-Pa' shown in FIG. 3. When, on the other hand, the diode $D_1$ is in the conducting state, the reference voltage for the voltage $v_6$ falls to a second level $Vref_2$ corresponding to the comfort line Pb-Pb' shown in FIG. 3; namely, the transistor $Q_1$ is turned on at the time when the voltage $v_6$ falls to the second reference voltage $Vref_2$. The relay RY-1 is coupled in series with the transistor $Q_1$, so that the switch RY-1-S is changed over between the contacts NO and NC shown in FIG. 1 as the transistor $Q_1$ is turned on and off. Thus, the temperature and the humidity are controlled within a region between the comfort lines Pa-Pa' and Pb-Pb' as described below.

In FIG. 3, lines Pa-Pa' and Pb-Pb', the upper and lower limit comfort lines plotted in the T-H (temperature-humidity) plane, define therebetween an allowable variation region of temperature and humidity within which they are controlled. The control of the temperature and humidity control device THC of FIG. 1 by the control circuit of FIG. 2 takes two different modes according to the initial position of the point representing the temperature and humidity in the T-H plane: a first mode is taken when the initial point falls in the region A which is situated above and to the right of the comfort line Pa-Pa'; a second mode is taken when it falls in the region B which is situated below and to the left of the comfort line Pb-Pb'. The initial point at which the device THC begins to be operated falls in the region A when the load to cooling operation is large in the room which is air-conditioned; it falls in the region B when the load is small. The load characteristics of a room depends on such factors as the structure, dimension, heat insulating property thereof, or the existance of heat sources (including human beings). The load of the room is large to the cooling operation when the temperature of the room tends to rise rapidly by its nature; conversely, it is small when it tends to remain low. In the following, the two modes of control operation of the device THC is described in greater detail.

The first control mode is effected along the solid line I of FIG. 3 as follows. When the initial point 0 in the T-H plane falls in the region A as shown in FIG. 3, the cooling operation is effected first from point 0 to reduce the temperature. At the time when the point in the T-H plane reaches point 1 on the lower limit comfort line Pb-Pb', the operation is switched to the slightly warming dehumidifying operation to reduce the humidity, whereby the temperature of the room rises by its natural tendency. Thus, the point in the T-H plane moves from point 1 to point 2 on the upper limit comfort line Pa-Pa'. When the point in the T-H plane reaches at point 2, the operation is again switched to the cooling mode and the point in the T-H plane turns to point 3 on the lower limit comfort line Pb-Pb'. Thus the point in the T-H plane moves in a zigzag line 1, 2, 3, 4, ---, 5 in FIG. 3. In this way, by alternating the cooling and the slightly warming dehumidifying operation in the allowable variation region between the upper and lower limit comfort lines Pa-Pa' and Pb-Pb', the temperature and humidity of the room are controlled to a comfortable condition at which these two values are balanced.

The second control mode is effected along the dotted line II of FIG. 3 as follows. When the initial point 0' falls in the region B in the T-H plane, the slightly warming dehumidifying operation is effected first from point 0'. At the time when the point 1' on the upper limit comfort line Pa-Pa' is reached, the operation is switched to the cooling operation. Thus, the point in the T-H plane moves from point 1' to point 2' on the lower limit comfort line Pa-Pa', at which the operation is again switched to the dehumidifying mode and the point in the T-H plane turns to point 3' on the upper limit comfort line Pa-Pa'. Thus the point in the T-H plane moves in a zigzag line 1', 2', 3', 4', ---, 5' in FIG. 3. In this way, by alternating the slightly warming dehumidifying operation and the cooling operation in the allowable variation region between the upper and lower limit comfort lines Pa-Pa' and Pb-Pb', the temperature and humidity of the room are controlled to a comfortable condition at which these two values are balanced.

The above described air conditioner (temperature and humidity control device) is controlled automatically according to a fixed standard. However, the condition which is felt comfortable varies according to the user's physiology, state of health, amount of physical excercise being performed, or amount of apparel. Thus, the above air conditioner has the disadvantage that the control standard cannot be adapted to the varying preferences and conditions of individual users. In view of this, the Japanese laid-open patent application No. 62-91735 discloses an air conditioner which is capable of modifying the control standard according to the preference and condition of individual users.

FIGS. 4 and 5 show the organization of the control device of such an air conditioner. An operation panel P shown in detail in FIG. 5 is provided with hotness sensation switches 1, operation mode selecting switch 2, an operation switch 3, and fan speed change-over switch 4. The hotness sensation switches 1 comprise a "too hot" switch 1a and a "too cold" switch 1b; the "too hot" switch 1a and "too cold" switch 1b are used when the user feels that it is too hot or too cold. The operation mode selecting switch 2 is for selecting the operation mode, i.e., the heating or the cooling mode, and the operation switch 3 is for starting the cooling or the heating operation. The fan speed change-over switch 4 is used for selecting the fan speed. A thermistor 5a detects the room temperature, and an A/D converter 5b converts the analog output of the thermistor 5a into a digital signal. A microcomputer 6 comprises an input circuit 6a, a CPU (central processing unit) 6b, a memory 6c, and an output circuit 6d. The microcomputer 6 compares the detected room temperature with the setting temperature, and controls the turning on and off of the compressor 7 according to the selected operation mode. Further, it sets the setting temperature two degrees lower than the room temperature when the "too hot" switch is turned on; conversely, it sets the setting temperature two degrees higher when the "too cold" switch is turned on. In addition, the microcomputer 6 controls the rotational speed of the fan 8 according to the input through the fan speed change-over switch 4.

FIG. 6 is a flowchart showing the steps followed by the microcomputer 6 in controlling the compressor 7 and the fan 8 during the heating operation. First, the heating mode is selected by means of the operation mode selecting switch 2. Next, when the operation switch 3 is turned on, the initial setting temperature is set at step 101, and the room temperature detected by the thermistor 5 is taken in at step 102. Further, the setting temperature is compared with the detected room temperature by the microcomputer 6 at step 103; when the setting temperature is higher than the room temperature, the compressor 11 is turned on at step 104; when, on the other hand, the setting temperature is lower than the room temperature, the compressor 11 is turned off at step 105. At the next step 106, judgement is made as to the fan speed input through the switch 4; when the switch 4 is at the "fast" position, the fan 8 is set at fast speed at step 107; on the other hand, when the switch 4 is at the "slow" position, the fan 4 is set at the slow speed at step 108. At step 109, judgement is made whether or not there is an input through the hotness sensation switches 1; when the judgement is negative, the control procedure returns to step 102; when, on the other hand, the judgement is affirmative, judgement is further made at the next step 110 as to which one of the two switches, the "too hot" switch 1a or the "too cold" switch 1b, is turned on. When the "too hot" switch 1a is turned on, the setting temperature is set two degrees lower than the current room temperature at step 111; when, on the other hand, the "too cold" switch 1b is turned on, the setting temperature is set two degrees higher than the current room temperature at step 112. Thereafter, the steps 102 through 112 are repeated.

The steps followed in the cooling operation is substantially the same as those of the heating operation described above: First, the cooling mode is selected by means of the operation mode selecting switch 2, and the steps corresponding to the steps 101 through 112 are followed. However, at the steps corresponding to steps 104 and 105 in the heating operation, the compressor 7 is turned off when the setting temperature is higher than the room temperature, and turned on when the setting temperature is lower than the room temperature.

The above air conditioner is capable of adapting the control standard to the individual preference of users. However, it has the following disadvantage. To start the operation, it is necessary to operate the operation mode selecting switch 2 as well as the operation switch 3. Further, the fan speed is selected by a separate switch 4. Thus, the procedure which must be followed by the user is complicated and cumbersome.

SUMMARY OF THE INVENTION

It is a primary object of this invention therefore to provide a control device for an air conditioner which is capable of operating in the heating and cooling operation mode, wherein the standard of control, such as the setting or target temperature, can be easily adapted to the preference of a person who is in the room conditioned by the air conditioner.

It is an additional object of this invention to provide such a control device for an air conditioner, whereby the procedure which should be followed by the user in operating the air conditioner to his or her preference is simple and easy; in particular, it is an object of this invention to provide such a control device, whereby the procedure to start the operation of the air conditioner is simplified.

The above objects are accomplished in accordance with the principles of this invention in a control device for an air conditioner comprising a hotness sensation input means and a mode selector means directly coupled to the output thereof. The hotness sensation input means may comprise two switches: a "too hot" switch which is to be operated by the user when he or she feels that it is too hot in the room conditioned by the air conditioner; and a "too cold" switch which is to be operated by the user when he or she feels that it is too cold in the same room. The mode selector selects the heating or the cooling operation mode in accordance with the nature of the first input of a sensation of hotness which is effected by the user for the first time in a period in which the air conditioner has been halted. The control device further comprises a room temperature detector for detecting the temperature of the room conditioned by the air conditioner, and a setting or target temperature determining means which determines the setting temperature in accordance with the sensations of hotness inputted by the user. A control means controls the output of the air conditioner in such a way that the deviation or error of the room temperature, detected by the room temperature detector, with respect to the setting temperature, may be reduced. The control means is activated by the first input of a sensation of hotness by the user.

It is preferred that the setting temperature is renewed each time a sensation of hotness is inputted through said input means, so that the setting temperature may represent the level of temperature which is best preferred by the user who is in the room conditioned by the air conditioner. The renewal may be effected by raising or lowering the setting temperature by predetermined number of degrees, e.g., two degrees, from the current level thereof, according to the nature of the inputted sensation of hotness. Alternatively, the new setting temperature may be set at a level higher or lower than the room temperature at that instant. On the other hand, the initial setting temperature may be determined on the basis of the room temperature and the last setting temperature in the previous heating or cooling operation; alternatively, it may be set at respective fixed levels in the heating and the cooling operation.

Thanks to the structure of this invention described above, the operation of the air conditioner is started automatically when a hotness sensation is inputted by the user through the hotness sensation input means for the first time in a period in which the air conditioner has been halted. Hence, the number of switches which should be operated by the user to start the air conditioner is much reduced. Further, the standard of control can be adapted to the individual preference of the user by simply inputting his or her sensations of hotness through the input means.

The control device may comprise means for determining the speed of the fan for delivering the warmed or cooled air to the room, in accordance with the number of inputs of hotness sensation which are effected by the user during a predetermined period of time. In such case, the amount of warmed or cooled air delivered to the room is changed in accordance with the preference of the user. Thus, not only the temperature, but also the speed of change thereof, can be adjusted to the preference of the user by simply inputting his or her sensations of hotness.

BRIEF DESCRIPTION OF THE DRAWINGS

The novel features which are characteristic of this invention is set fourth with particularity in the appended claims; this invention itself, however, both as to its organization and method of operation, together with further objects and advantages thereof, may best be understood by the following detailed description of the preferred embodiments, taken in conjunction with the accompanying drawings, in which:

In the drawings, like reference numerals and characters represent like or corresponding parts or portions.

DETAILED DESCRIPTION OF THE PREFERRED EMBODIMENTS

Referring now to FIGS. 7 through 18 of the drawings, a first through a fourth embodiment according to this invention is described.

First Embodiment

Figure 7:
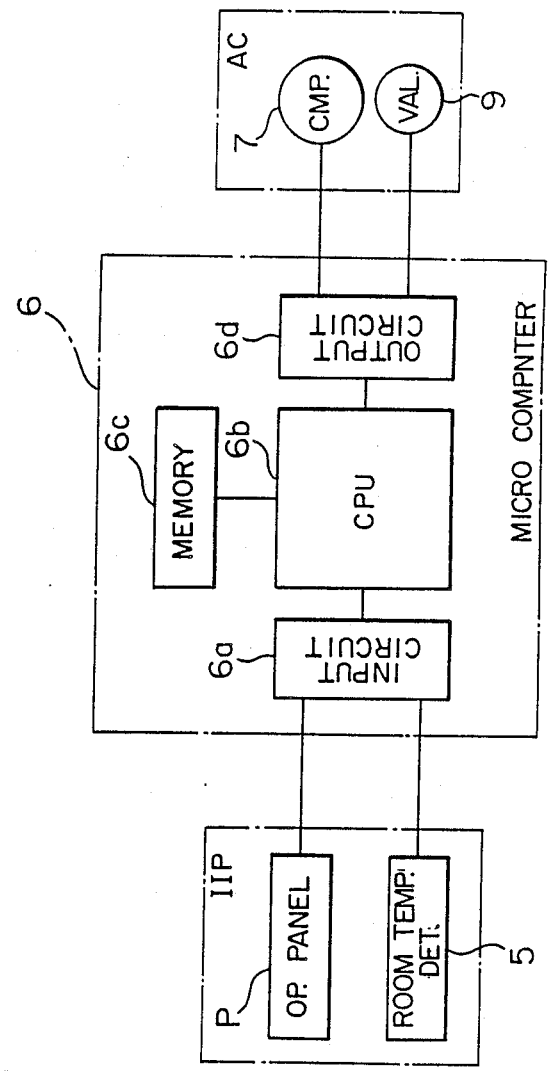
FIG. 7 is a block diagram similar to that of FIG. 4, but showing an organization of a first embodiment of this invention.

FIG. 7 shows the overall organization of the control device for an air conditioner according to a first embodiment of this invention. The air conditioner AC is of the type which effects both heating and cooling operation by means of a heat pump system driven by a compressor 7. The direction of circulation of the refrigerant gas, such as one of the Freon group, is changed over by a four-way valve 9. Thus, in the cooling operation, the air cooled by the evaporation of the refrigerant gas is delivered to the room in which the air conditioner AC is installed; in the heating operation, on the other hand, the air warmed by the condensation thereof is delivered to the room.

Figure 1:
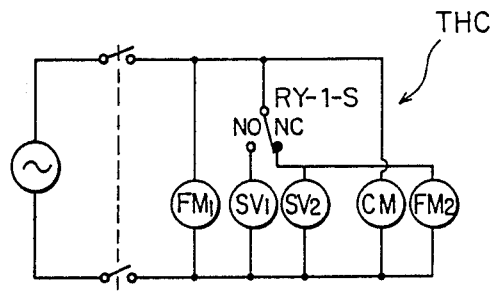
FIG. 1 is a circuit diagram of a conventional air conditioner (a temperature and humidity control device)
Figure 2:
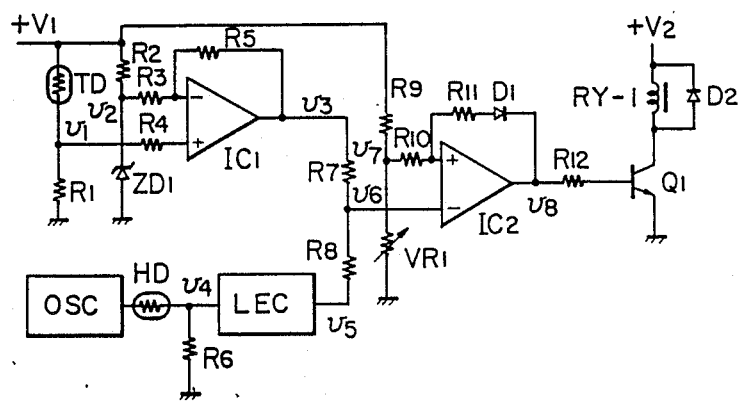
FIG. 2 is a circuit diagram of the control device for the air conditioner of FIG. 1, wherein the standard of control is fixed.
Figure 3:
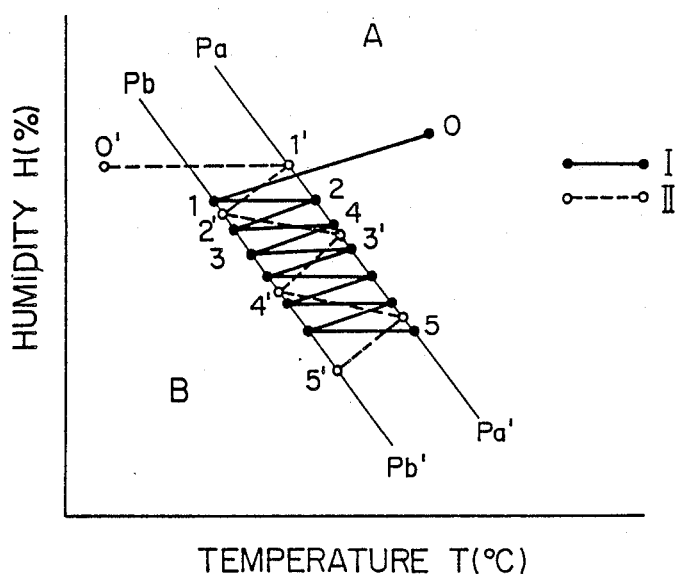
FIG. 3 is a diagram showing two control modes of the control device of FIG. 2 on a temperature-humidity plane.
Figure 4:
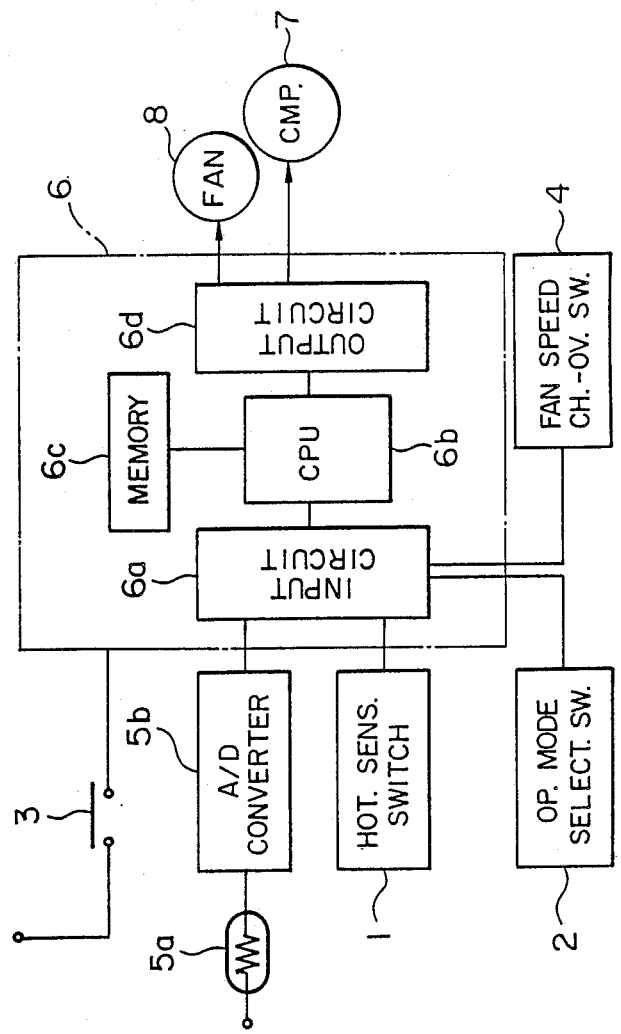
FIG. 4 is a block diagram showing the organization of a conventional control device for an air conditioner which comprises switches for inputting hotness sensations of the user.
Figure 5:
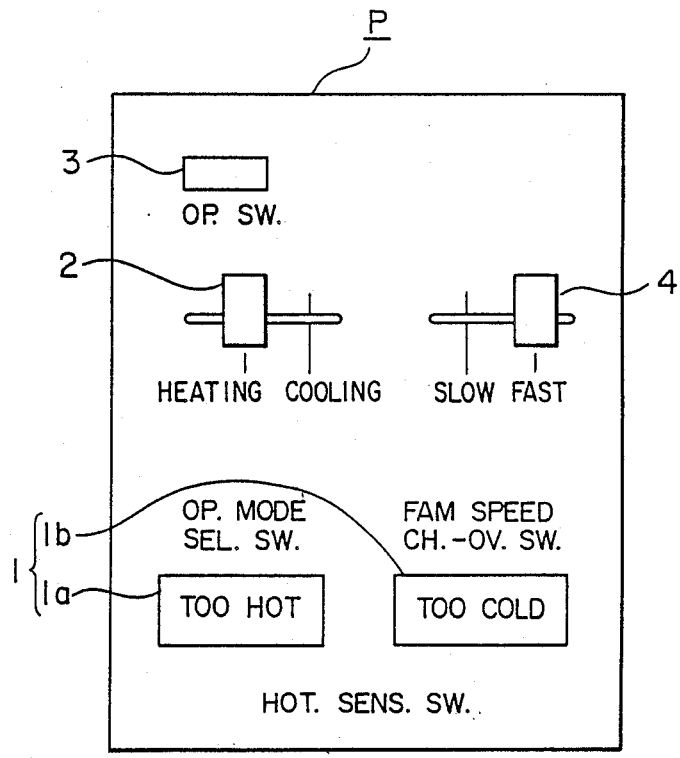
FIG. 5 is a diagram showing the operation panel of the control device of FIG. 4.
Figure 6:
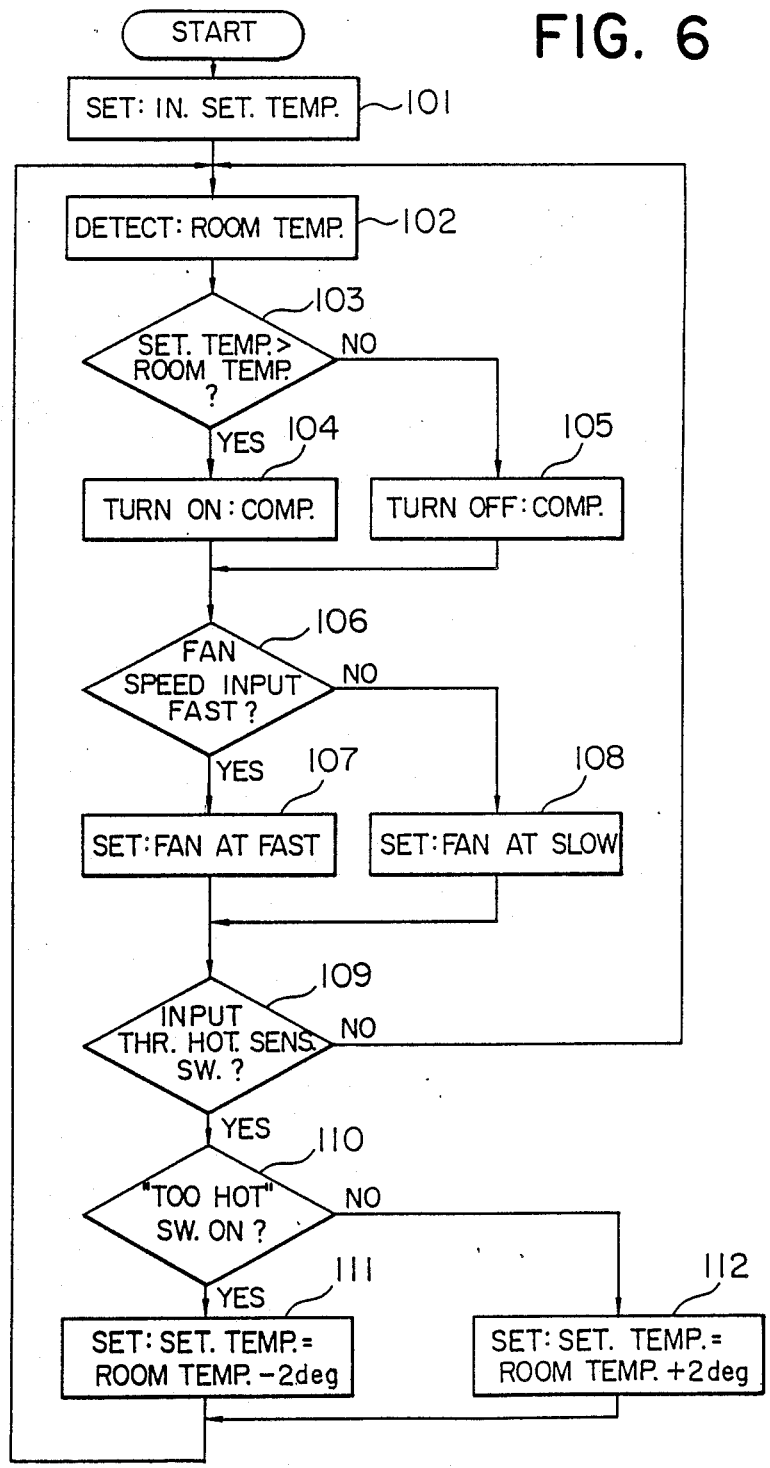
FIG. 6 is a flowchart showing the steps followed by the control device of FIG. 4 in controlling the air conditioner.
Figure 8:
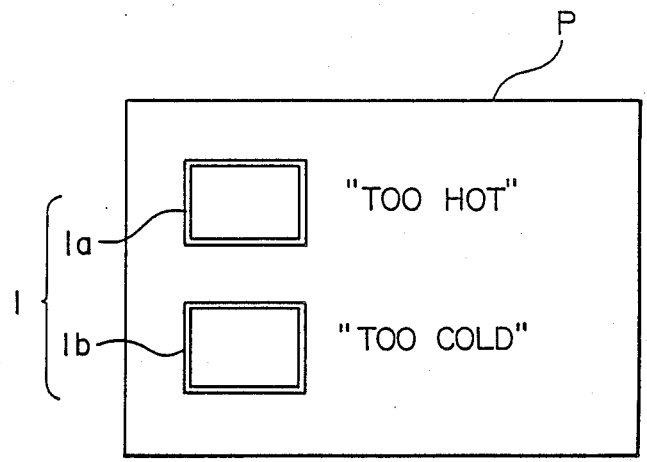
FIG. 8 is a diagram showing the operation panel of the control device according to the first embodiment of this invention.

The microcomputer 6 constituting the main portion of the control device for the air conditioner AC comprises an input circuit 6a, a central processing unit 6b, a memory 6c, and an output circuit 6d. The output circuit 6d outputs controls signals, which are described in detail below, to the compressor 7 and the four-way valve 9 of the air conditioner AC. The input circuit 6a receives the signals from the information input portion IIP of the control device, which includes an operation panel P and a room temperature detector 5. As shown in FIG. 8, the operation panel P according to this invention comprises only two hotness sensation switches 1: a "too hot" switch 1a and "too cold" switch 1b. Other switches, such as an operation switch for starting the operation or an operation mode selecting switch, provided on the panel of the control device of FIGS. 4 and 5, are dispensed with. The "too hot" switch 1a and the "too cold" switch 1b are operated by the user when he feels it is too hot or too cold, respectively; the room temperature detector 5 may comprise a thermistor and a analog-to-digital converter and outputs a signal corresponding to the temperature of the room conditioned by the air conditioner AC.

Figure 9:
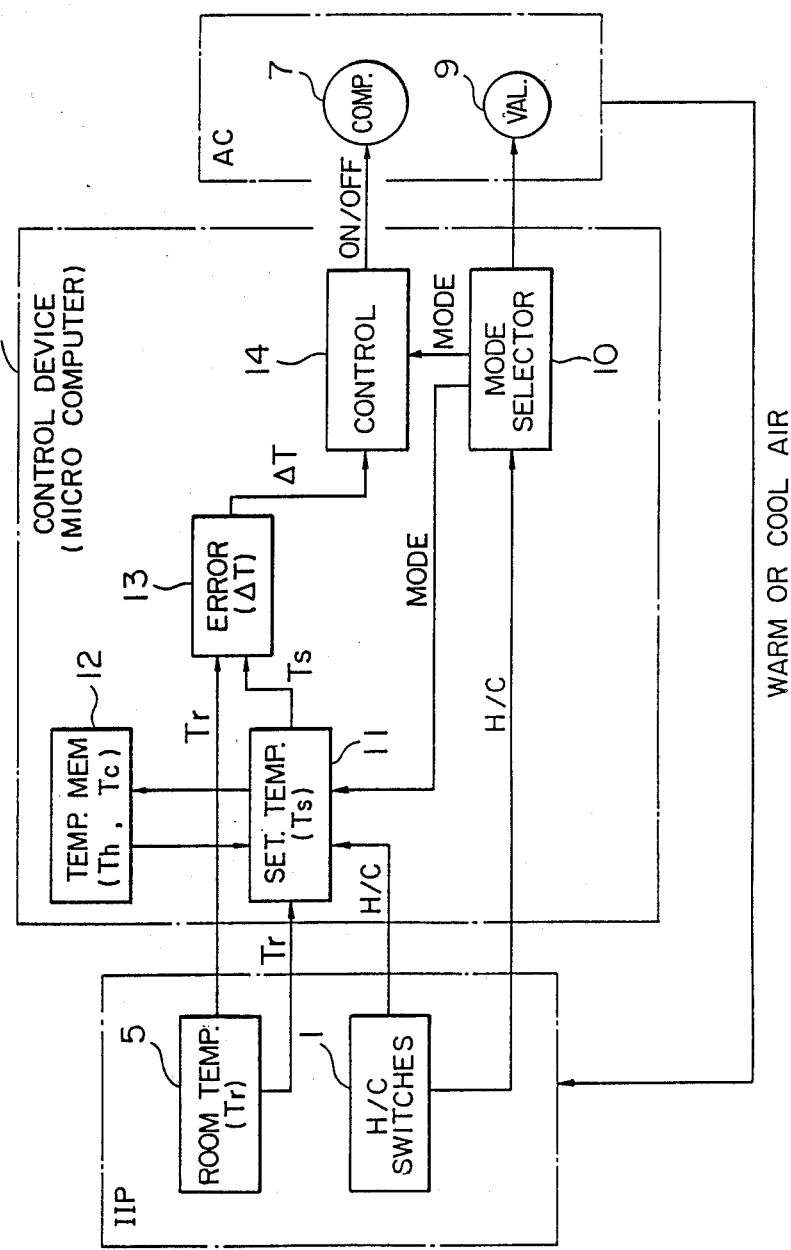
FIG. 9 is a block diagram showing a functional organization of the first embodiment of this invention.

FIG. 9 is a block diagram showing the functional organization of the control device (the microcomputer) 6. According to the functional point of view adopted in this figure, the control device (microcomputer) 6 comprises following elements or means: a mode selector means 10 coupled to the output of the hotness sensation switches 1; a setting temperature (i.e. target temperature) determining means 11 coupled to the output of the hotness sensation switches 1 and the room temperature detector 5, and, preferably, to the output of the mode selector means 10; temperature memory means 12 for receiving and giving information (concerning the last setting temperatures, Th and Tc, in the heating and the cooling operation, as described in detail below) to and from the setting temperature determining means 11; a comparator or error computation means 13 coupled to the outputs of the room temperature detector 5 and the setting temperature determining means 11; and a control means 14, coupled to the outputs of the mode selector means 10 and the error computation means 13, for controlling the turning on and off of the compressor 7 to reduce the error computed by means 13.

The method of operation of the control device according to the first embodiment is as follows:

When one of the hotness sensation switches 1, i.e., the "too hot" switch 1a or the "too cold" switch 1b, is operated by the user, a hotness sensation signal H/C, indicating that one or the other of the hotness sensation switches 1 is operated, is outputted from the hotness sensation switches 1. When the signal H/C is outputted for the first time in a period in which the air conditioner has been halted, mode selector means 10, in immediate response thereto, selects the operation mode and outputs a signal for adjusting the position of the four-way valve 9. Namely, the mode selector 10 selects the cooling mode and changes over the valve 9 to the position of the cooling operation when the "too hot" switch 1a is operated; it selects the heating mode and changes over the valve 9 to the position of the heating operation when the "too cold" switch 1b is operated. Thus, no separate mode selection switch is necessary according to this invention. Further, the mode selector 10 outputs the result of mode selection to the control means 14, which, in response thereto, starts to control the compressor 7 of the air conditioner AC as described in detail below.

Setting temperature determining means 11 determines the initial and later setting (i.e. target) temperatures on the basis of four pieces of information: the hotness sensation signals H/C indicating a user's operation of the "too hot" switch 1a or the "too cold" switch 1b; the mode selected by the mode selector means 10 (which, in its turn is determined by the initial hotness sensation signal); the room temperature Tr detected by the room temperature detector 5; and the last value of the setting temperature Th or Tc (Th is the last value of the setting temperature used in the previous heating operation; Tc is the last value of the setting temperature used in the previous cooling operation) stored in the temperature memory means 12.

The initial setting temperature is determined by temperature setting means 11 as follows: when the hotness sensation signal H/C is inputted for the first time from switches 1 after the last halting of the air conditioner AC, the previous setting temperature level, Th or Tc, corresponding to the mode selected by the mode selector means 10, is read out of the memory means 12; namely, the last setting temperature Th in the previous heating operation is read out when the "too hot" switch 1a is operated for the first time, while the last setting temperature Tc in the previous cooling operation is read out when the "too cold" switch 1b is operated. Then, the room temperature Tr detected by the room temperature detector 5 is compared with the value Th or Tc read out of the memory 12, and a suitable setting temperature Ts is determined on the basis of the two values Tr and Th, or the two values Tr and Tc, as described in detail in the following in reference to FIGS. 10a and 10b. The inital setting temperature Ts must be set higher than the room temperature Tr in the heating mode, and lower in the cooling mode. Thus, in the heating mode, it is set at a temperature higher than the room temperature by predetermined degrees (e.g. two degrees centigrade) if the previous setting temperature Th is not higher than the room temperature Tr; otherwise it is set at the value Th. In the cooling mode, on the other hand, the initial setting temperature is set at a temperature lower than the room temperature by predetermined degrees (e.g. two degrees centigrade) if the previous setting temperature Tc is not lower than the room temperature Tr; otherwise it is set at the the value Tc read out of the memory means 12.

The setting temperature Ts is renewed later every time a hotness sensation signal H/C is inputted by the user during the time in which the air conditioner AC is in continuous operation: the setting temperature Ts is set two degrees higher than the room temperature Tr currently detected by the detector 5 when the "too cold" switch 1b is operated; it is set two degrees lower the same temperature Tr when the "too hot" switch 1a is operated. Each time the setting temperature Ts is set or renewed, it is stored in the temperature memory means 12, as the last value of Th in the heating operation when the operation is in the heating mode; as the last value of Tc in the cooling operation when the operation is in the cooling mode.

The error computation means 13 compares the room temperature Tr currently detected by the detector 5 with the current setting or target temperature Ts outputted from the setting temperature determining means 11, and outputs the deviation or error of the current room temperature Tr with respect to the current setting temperature Ts: $\Delta T = Ts - Tr$. The control means 14 controls the turning on and off of the compressor 10 according to the value of the error $\Delta T$ and the mode selected by the mode selector means 10. Namely, when the heating mode is being selected by the selector means 10, the control means 14 turns on the compressor whenever the above error $\Delta T$ is positive, i.e. if the current room temperature is below the target level, and turns it off otherwise; on the other hand, when the cooling mode is being selected, the control means 14 turns on the compressor 7 whenever the above error $\Delta T$ is negative, i.e. if the current room temperature is above the target level, and turns it off otherwise.

Figure 10A:
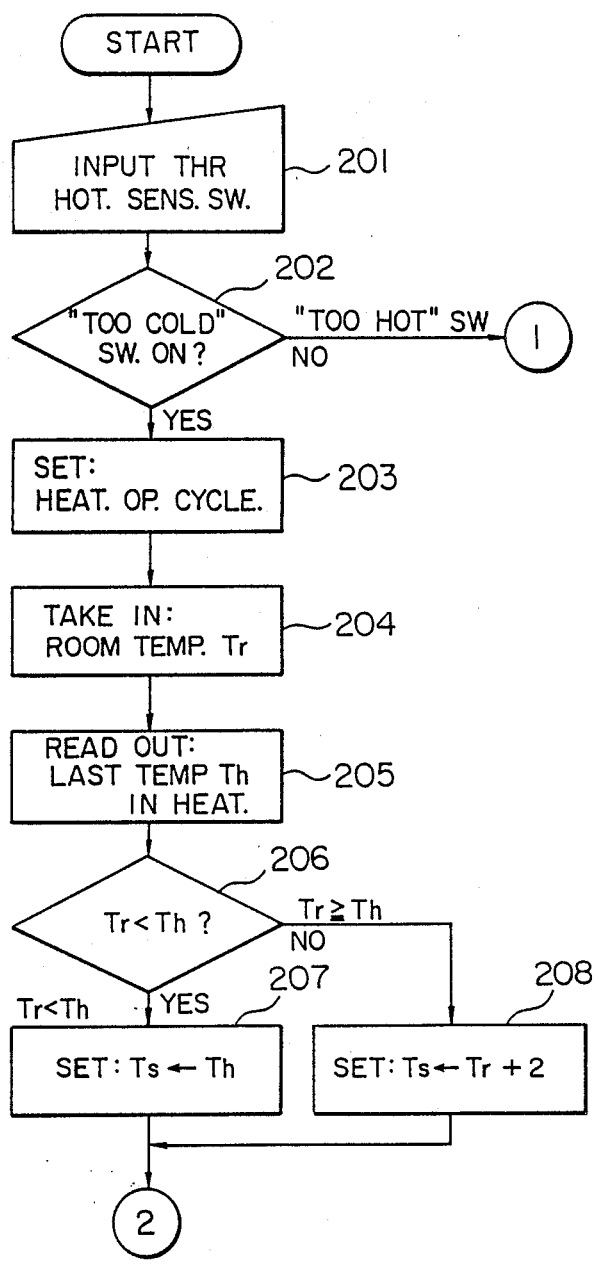
FIGS. 10a through 10c are flowcharts showing the steps which are followed by the control device according to the first embodiment of this invention in controlling the air conditioner.
Figure 10B:
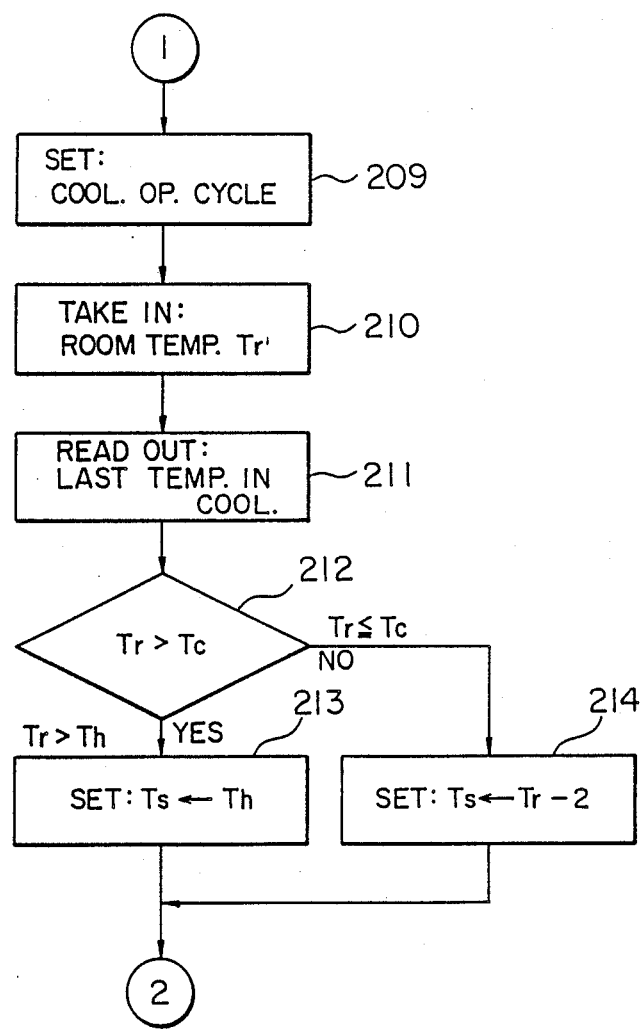
Figure 10C:
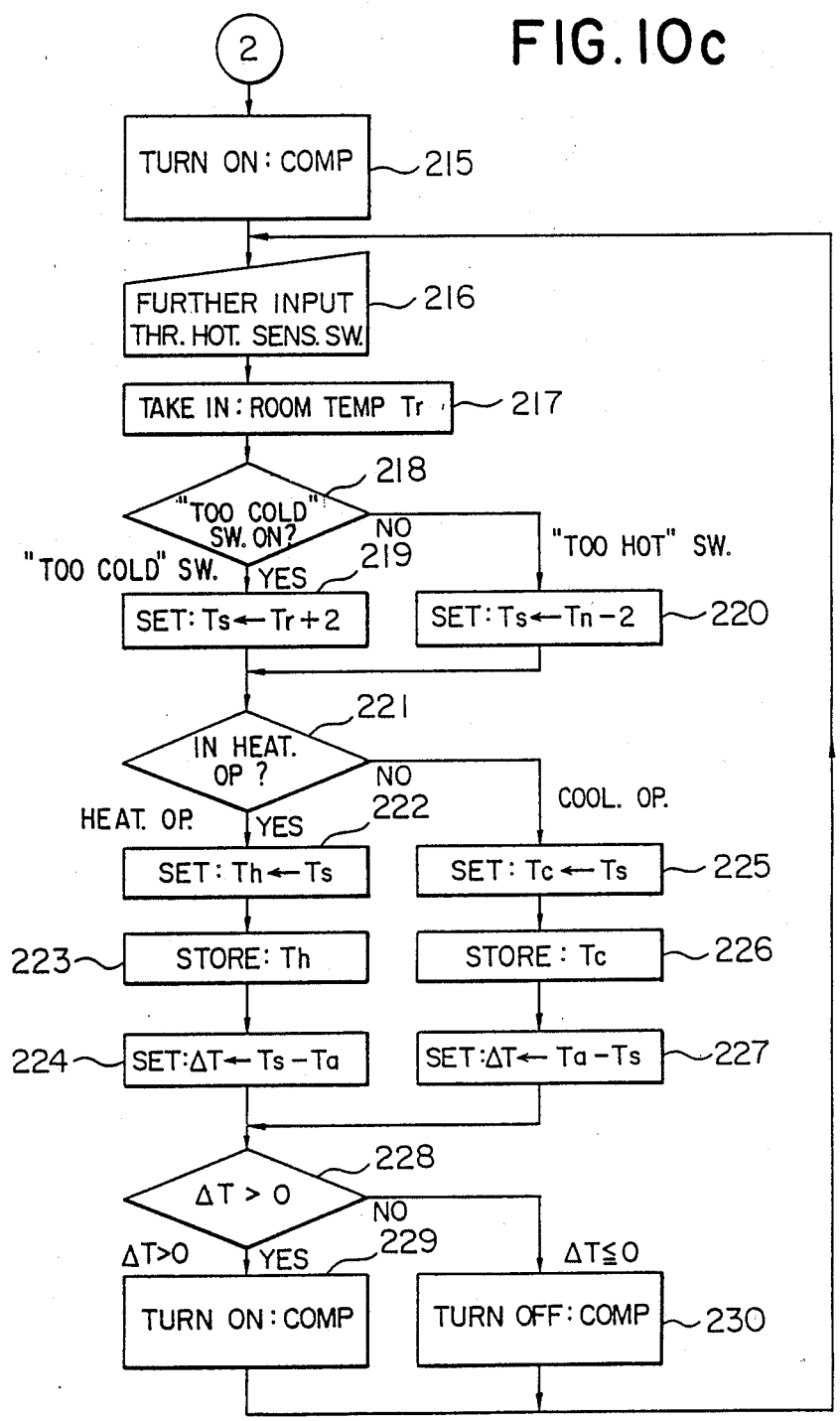

Referring now to FIGS. 10a through 10c, the steps followed by the control device (microcomputer) 6 is described in detail. Although these steps are effected by means of a program stored in the microcomputer, they are explained in the following as functions of the means shown in FIG. 9 for the sake of clearness.

FIG. 10a shows the steps which are followed until the initial setting temperature is determined by the setting temperature deteterming means 11, in the case where "too hot" switch 1a is operated for the first time after the period in which the air conditioner AC has been halted. The control procedure begins at step 201 at which the "too hot" switch 1a or the "too cold" switch 1b is operated by the user; at the next step 202, judgement is made whether the switch operated by the user is "too hot" switch 1a or "too cold" switch 1b. If it is the "too hot" switch 1a, the program proceeds to step 203 of heating operation cycle; on the other hand, if it is "too hot" switch 1a, the program proceeds to step 209 of the routine of the cooling operation cycle shown in FIG. 10b, which is described below. At step 203, heating mode is selected and the four-way valve 9 is set to the position of heating operation cycle by the mode selector means 10. At step 204, the current room temperature Tr detected by the room temperature detector 5 is taken in and registered, and at step 205, the last setting temperature Th in the previous heating operation is read out of the temperature memory 12 and registered; these steps 204 and 205 are effected by the setting temperature determining means 11. At the succeding steps 206 through 208, the setting temperature determining means 11 determines the initial setting temperature Ts as follows: at step 206, the current room temperature Tr taken in and registered at step 204 is compared with the last setting temperature Th in the previous heating operation, read out and registered at step 205. In the case where the last setting temperature Th in the previous heating operation is higher than the current room temperature Tr, the initial setting temperature Ts is set at the last setting temperature Th at step 207; on the other hand, in the case where the the last setting temperature Th is not higher than the current room temperature Tr, the initial setting temperature Ts is set at a level which is higher than the current room temperature Tr by a predetermined number of degrees, e.g., two degrees, at step 208. After the step 207 or 208, the program proceeds to the operation routine shown in FIG. 10c, which is described below.

FIG. 10b shows the steps which are followed in the case where it is judged, at step 202, that the "too hot" switch 1a is operated by the user. Then, at step 209 following the step 202, the mode selector means 10 sets the four-way valve 9 to the position of cooling operation cycle. At the next step 210, the current room temperature Tr detected by the room temperature detector 5 is taken in and registered, and at step 211, the last setting temperature Tc in the previous cooling operation is read out of the temperature memory 12 and registered; these steps 210 and 211, corresponding to the steps 204 and 205 of the heating operation cycle, are effected by the setting temperature determining means 11. At the succeding steps 212 through 213, the setting temperature determining means 11 determines the initial temperature in a way analogous to that of the steps 206 through 208: at step 212, the current room temperature Tr taken in an registered at step 210 is compared with the last setting Temperature Tc in the previous cooling operation read out and registered at step 211. In the case where the last setting temperature Tc in the previous cooling operation is lower than the current room temperature Tr, the initial setting temperature Ts is set at the last setting temperature Tc at step 213; on the other hand, in the case where the the last setting temperature Tc is not lower than the current room temperature Tr, the initial setting temperature Ts is set at a level which is lower than the current room temperature Tr by a predetermined number of degrees, e.g., two degrees, at step 214. After the step 213 or 214, the program proceeds to the operation routine shown in FIG. 10c, which is described below.

FIG. 10c shows the steps followed, during a heating or cooling operation cycle, after the initial setting temperature is set. At step 215, the compressor 7 is turned on by the control means 14. Thereafter, even if one of the hotness sensation switches 1, "too hot" switch 1a or "too cold" switch 1b, is operated by the user, the control means 14 turns on and off the compressor 7 according to the value of the error $\Delta T$ computed by the error computation means 13, as described above, so that the room temperature may approach the current setting temperature Ts. On the other hand, each time a further operation of one of the hotness sensation switches 1 is effected by the user, the steps 216 through 230 as described below are followed.

When "too hot" switch 1a or "too cold" switch 1b is operated by the user at step 216, the current room temperature Tr, detected by the room temperature detector 5 at the instant, is taken in and registered at step 217. At the next step 218, judgement is made whether the operated switch is the "too cold" switch 1b or not. In the case where "too cold" switch 1b is operated, the setting temperature determining means sets, at step 219, the setting temperature Ts at a level which is higher than the current room temperature Tr (renewed at step 217) by a predetermined number of degrees e.g., two degrees; when, on the other hand, "too hot" switch 1a is operated, the setting temperature Ts is set, at step 220, at a level which is lower than the current room temperature Tr by a predetermined number of degrees, e.g., two degrees. Further, at step 221, judgement is made whether the operation is in the heating cycle or not. When the operation of the air conditioner AC is the heating cycle, i.e., when the heating mode has been selected by the mode selector 10 at step 203, steps 222 through 224 is followed: at steps 222 and 223, the value of the temperature Th in the memory means 12 is renewed; namely, Th is set at the current setting temperature Ts at step 222, and the new value of Th is stored in the temperature memory means 12; further, at step 224, the error: $\Delta T = Ts - Tr$ is computed by the error computation means 13. On the other hand, when the operation is in the cooling cycle, steps 225 through 227 are followed: at steps 225 and 226, the value of Tc in the memory means 12 is renewed, instead of the value of Th; namely, Tc is set at the current value of Ts at step 225 and the new value of Tc is stored in the memory means 12 at step 226; further, at step 227, the error: $\Delta T = Tr - Ts$ is computed (the sign of $\Delta T$ is inverted with respect to that of the previous description; the inversion may be effected by the control means 14). At the suceeding steps 228 through 230, the control means 14 controls the turning on and off of the compressor according to the value of the error $\Delta T$: at step 228, judgement is made whether the value of the error $\Delta T$, as defined at the steps 224 and 227, is positive or not; if the error $\Delta T$ is positive, that is, if the target room temperature which is represented by the setting temperature Ts is not yet attained, the compressor 7 is turned on at step 229. On the other hand, if the above error $\Delta T$ is equal to zero or negative, that is, if the room temperature has already attained the target temperature, the compressor 7 is turned off at step 230.

As described above, according to the first embodiment of this invention, the mode selector means 10 automatically selects the operation mode in response to the first input of the hotness sensation signal H/C, thereby letting the control means 10 start to control the compressor 7. Further, the setting temperature Ts is renewed, each time a hotness sensation signal H/C is inputted by the user, to a level which is higher or lower than the room temperature Tr by a predetermined number of degrees. In addition, the initial setting temperature Ts is determined on the basis of the current room temperature and the last setting temperature, Th or Tc, in the previous heating or cooling operation. Thus, an environment best suited to the user can be created easily and quickly.

Second Embodiment

The organization and method of operation of a control device for an air conditioner according to a second embodiment of this invention is similar to those of the first embodiment described above; in particular, the functional organization shown in FIG. 9 applies to the second embodiment except for the following points:

The temperatures Th and Tc stored in the memory 12 are fixed predetermined levels which are not renewed; further, when the first hotness sensation signal H/C is inputted through the hotness sensation switches 1 and the heating or the cooling mode is selected by the mode selector means 10, the initial setting or target temperature Ts is set by the setting temperature determining means 11 at one of the above mentioned fixed predetermined levels Th and Tc: at Th if the selected mode is the heating operation mode; at Tc if it is the cooling mode. When, on the other hand, further hotness sensation signal H/C is inputted through switches 1 by the user, the setting temperature determining means 11 renews the setting temperature Ts in the following manner: If the "too cold" switch 1b is operated by the user, the level of the setting temperature Ts is raised by a predetermined number of degrees (e.g., two degrees centigrade) for the current level thereof; namely, the new value of Ts is set at the value: (previous level of Ts)+(predetermined number of degrees). If, on the other hand, the "too hot" switch 1a is operated by the user, the level of Ts is lowered by a predetermined number of degrees (e.g., two degrees); namely, the new value of Ts is set at: (previous level of Ts)−(predetermined number of degrees). Except for the differences mentioned above, the organization and method of operation of the control device according to the second embodiment is similar to those of the first embodiment.

Figure 11:
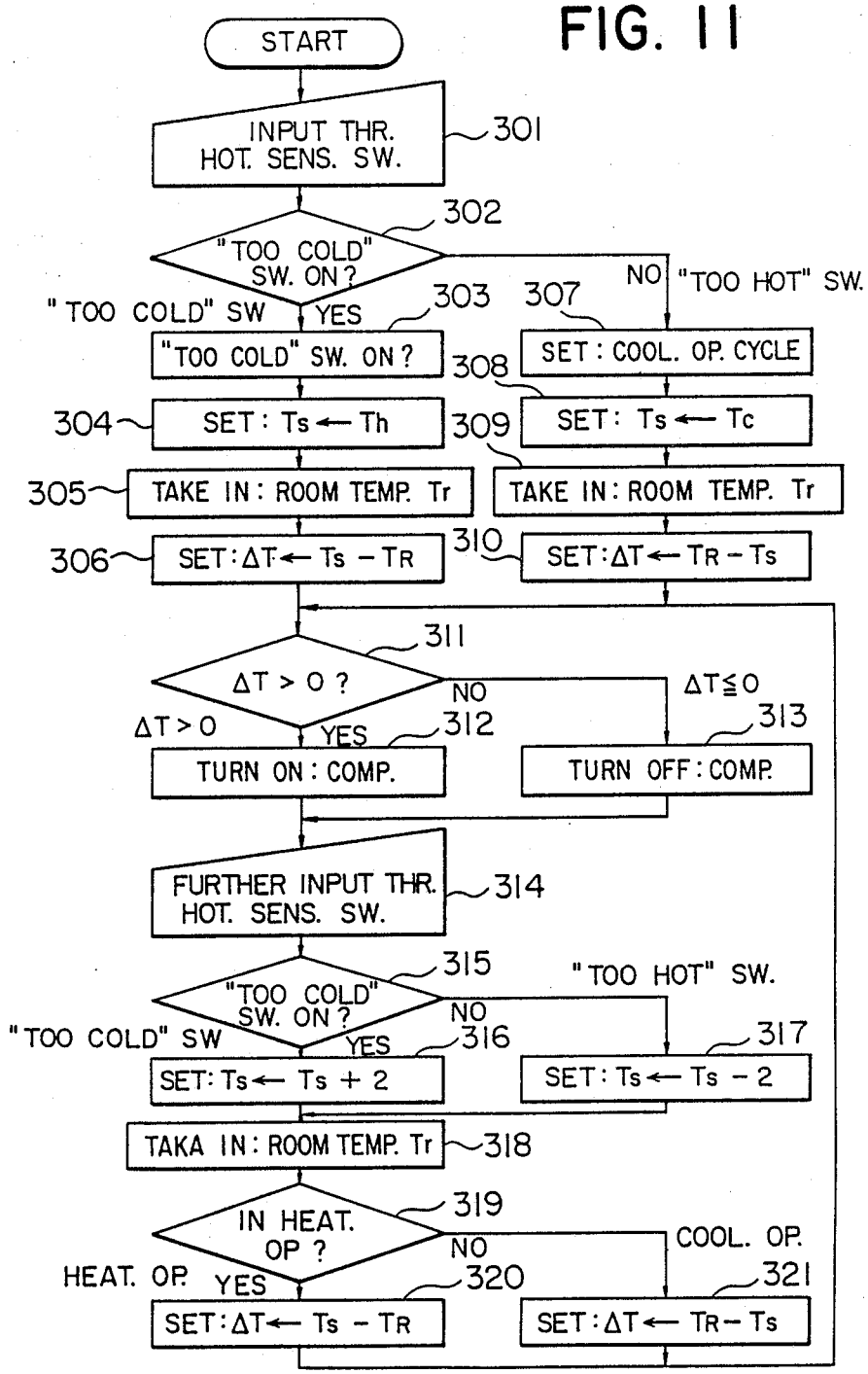
FIG. 11 is a flowchart which are followed by the control device according to a second embodiment according to this invention.

Referring now to FIG. 11 of the drawings, the steps followed by the control device according to the second embodiment is described in detail, in which reference is also made to FIG. 9 to made the explanation clearer.

When at step 301, the user operates one of the hotness sensation switches 1, "too hot" switch 1a or "too cold" switch 1b, judgement is made at step 301, as to the question: which one of the switches 1, "too hot" switch 1a or "too cold" switch 1b, has been operated by the user. In the case where "too cold" switch 1b has been operated, steps 303 through 306 are followed thereafter: at step 303, the mode selector means 10 selects the heating operation mode and sets the four-way valve 9 to the position for the heating operation; at step 304, the setting temperature determining means 11 sets the initial setting temperature Ts at the predetermined fixed level Th, which is stored in the memory as the initial setting or target temperature for the heating operation; at step 305, the current room temperature Tr detected by the room temperature detector 5 is taken in and registered; and at step 306, the error $\Delta T$ defined by the equation: $\Delta T = Ts - Tr$ is computed by error computation means 13. On the other hand, when it is judged at step 302 that "too hot" switch 1a has been operated, alternative sequence of steps 307 through 310 is followed: at step 307, the mode selector means 10 selects the cooling operation mode and sets the four-way valve 9 to the position corresponding to the cooling operation; at step 308, the setting temperature determining means 11 sets the initial setting temperature at the other one of the predetermined fixed levels, Tc, which is stored in the temperature memory means 12 as the initial setting or target temperature in the cooling operation; at step 309, the current room temperature Tr detected by the room temperature detector 5 is taken in and registered; and at step 310, the error $\Delta T$ defined by the equation: $\Delta T = Tr - Ts$ is computed by the error computation means 13.

At the steps 311 through 313 subsequent to the step 306 or 310, the compressor 7 is turned on and off by the control means 14 according to the value $\Delta T$ as defined above at step 306 or 310. Namely, at step 311, judgement is made whether the error $\Delta T$ is positive or not; that is, whether the current room temperature Tr is below the setting or target temperature Ts or not, in the case where heating operation has been selected at step 303; whether the current room temperature Tr is above the setting or target temperature Ts or not, in the case where cooling operation is selected at step 307. If the error $\Delta T$ is judged to be positive at step 311, the control means 14 turns on the compressor at step 312; if, on the other hand, it the error $\Delta T$ is judged to be equal to zero or less, i.e. negative, the control means 14 turns off the compressor at step 313. The control means 14 repeats these steps 311 through 313 even if no further hotness sensation signals H/C is inputted through the switches 1, so that the room temperature may be controlled to the setting or target level Ts.

When a further hotness sensation signal H/C is inputted by the user through the switches 1, as shown at step 314, the level of the setting temperature Ts, and hence the value of the error $\Delta T$ depending thereon, are renewed as follows: at step 315, judgement is made as to the question: which one of the switches, "too hot" switch 1a or "too cold" switch 1b, has been operated; if it is the "too cold" switch 1b that has been operated, the setting temperature Ts is raised from the current level by a predetermined number of degrees, e.g., two degrees, at step 316; if, on the other hand, it is the "too hot" switch 1a that has been operated, the setting temperature Ts is lowered from the current level by a predetermined number of degrees, e.g., two degrees, at step 317. At the next step 318, the room temperature Tr is renewed: the temperature detected by the room temperature detector 5 at the instant is taken in and registered. Further, at step 319, judgement is made whether the air conditioner AC is in the heating operation mode or not; it is in the heating operation mode, the error $\Delta T$ is computed by the equation: $\Delta T = Ts - Ts$ at step 320; if, on the other hand, the air conditioner is in the cooling operation, the error $\Delta T$ is computed by the equation: $\Delta T = Tr - Ts$ at step 321. After the step 320 or 321, the control program returns to steps 311 through 313, at which the control means 14 controls the turning on and off of the compressor 7 of the air conditioner according to the new value of the error $\Delta T$ computed at step 320 or 321. The steps 314 through 321 are repeated, in addition to the steps 311 through 313, when a further hotness sensation signal H/C is inputted through the switches 1 by the user, so that the setting temperature may be adjusted to the level which is best preferred by the user operating the switches 1.

Third Embodiment

Figure 12:
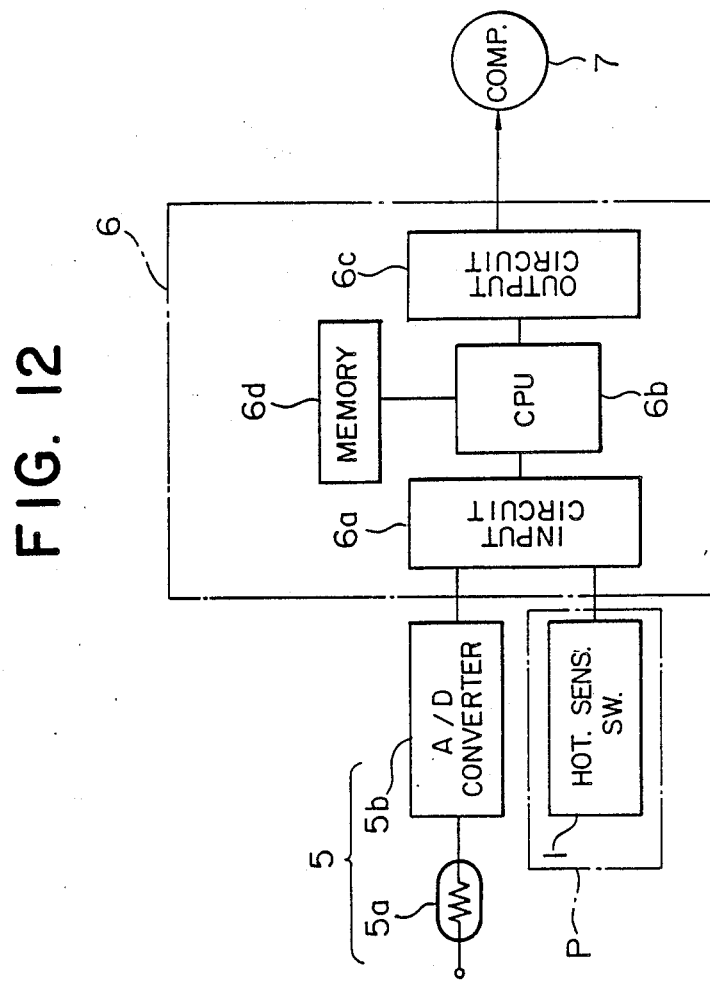
FIG. 12 is a view similar to that of FIG. 7, but showing an organization of a third embodiment of this invention.
Figure 13:
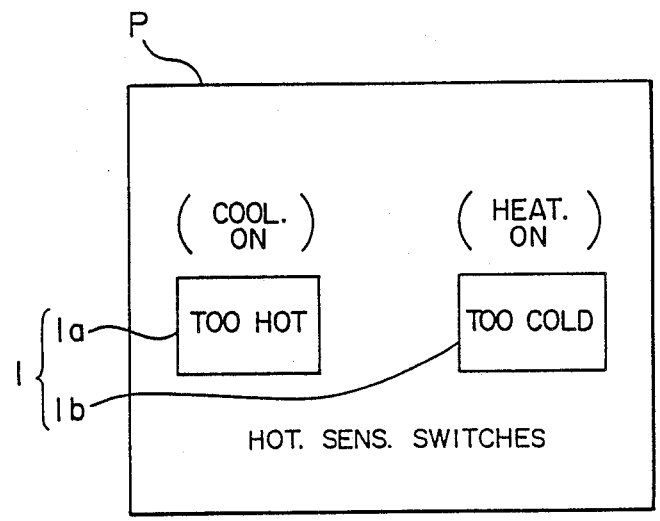
FIG. 13 is a diagram showing the operation panel of the control device according to the third embodiment of this invention.

FIGS. 12 through 13 show the organization of a control device according to a third embodiment of this invention. As is apparent from these figures, the organization of the third embodiment is similar to that of the first embodiment shown in FIGS. 7 and 8, although FIG. 12 shows in detail the two components of the room temperature detector 5: thermistor 5a, two-terminal ceramic-like semiconductor, having a negative temperature coefficient of resistance; and an analog-to-digital converter 5b, coupled to the output of the thermistor 5a, for coverting analog output of thermistor 5a into a digital signal. Thus, description of the organization of the third embodiment in reference to FIGS. 12 and 13 are omitted, wherein like portions are designated by like reference numerals in corresponding figures.

Figure 14:
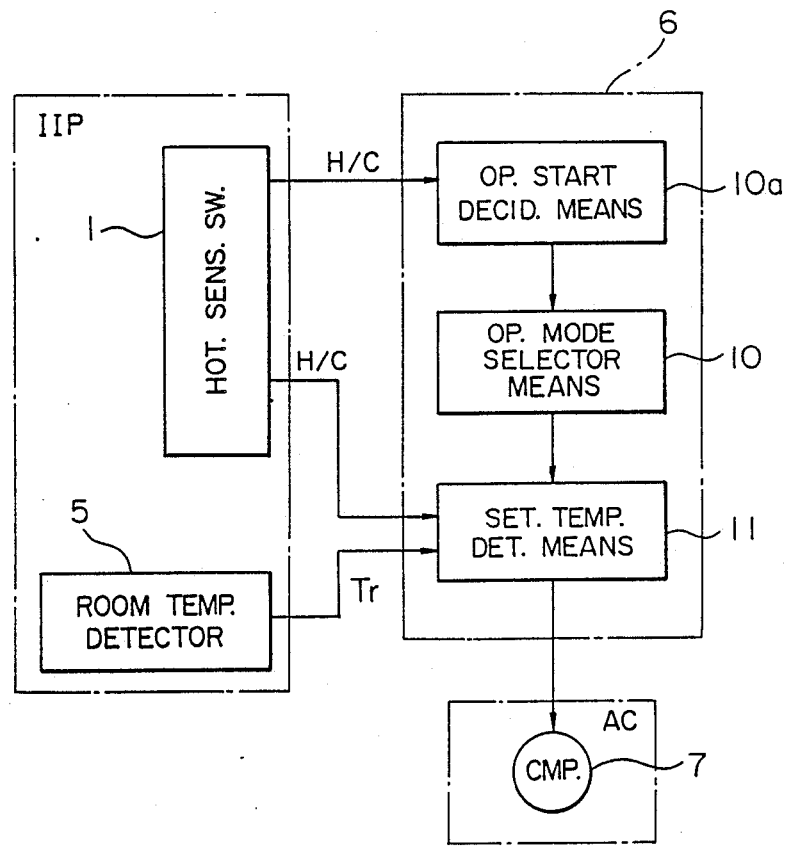
FIG. 14 is a block diagram showing the functional organization of the control device according to the third embodiment of this invention, from a point of view which is different from that adopted in FIG. 9.

FIG. 14, on the other hand, shows the functional organization of the control device according to the third embodiment from a point of view which is different from that adopted in FIG. 9. Thus, the control device (microcomputer) 6 comprises, in addition to the operation mode selector means 10 and setting temperature determining means 11, operation start deciding means 10a; on the other hand, temperature memory means 12, error computation means 13, and control means 14 shown in FIG. 9 are not shown in FIG. 14. However, these differences in the two figures are due more to the different view points adopted in them than to real structural differences between them. Thus, a means corresponding to the operation start deciding means 10a of FIG. 14 may be considered to be comprised in the mode selector means 10 of FIG. 9; on the other hand, the setting temperature determining means 11 of FIG. 14 may be considered to comprise means which corresponds essentially to the temperature memory means 12, error computation means 13, and control means 14 of FIG. 9. Further, the four-way valve 9 of the air conditioner AC shown in FIG. 9 may be considered to be comprised in the mode selector means 10 of FIG. 14.

Operation of means 10a, 10, and 11 shown in FIG. 14 is as follows. The operation start deciding means 10a decides whether or not the operation is to be started, on the basis of the existance or non-existance of the hotness sensation signal H/C, inputted by the user through the switches 1. The mode selector means 10 selects the operation mode according to the first hotness sensation signal H/C, and changes over the four-way valve to the position corresponding to the selected operation mode. The setting temperature determining means 11 determines the setting temperature on the basis of the hotness sensation signals H/C, and the room temperature detected by the detector 5; further, it controls the turning on and off of the compressor 7 so that the room temperature may approach the setting temperature. The initial setting temperature Ts may be set, as in the case of the second embodiment, at a fixed level, Th or Tc, which is a predetermined initial setting temperature for the heating or the cooling operation. On the other hand, the setting temperature Ts is renewed in a manner similar to that adopted in the first embodiment: each time "too cold" switch 1b is operated, the setting temperature Ts is set at a level higher than the room temperature at that instant by a predetermined number of degrees (e.g., two degrees); on the other hand, it is set at a level lower than the room temperature at that instant by a predetermined number of degrees (e.g., two degrees), when "too hot" switch 1a is operated.

Figure 15:
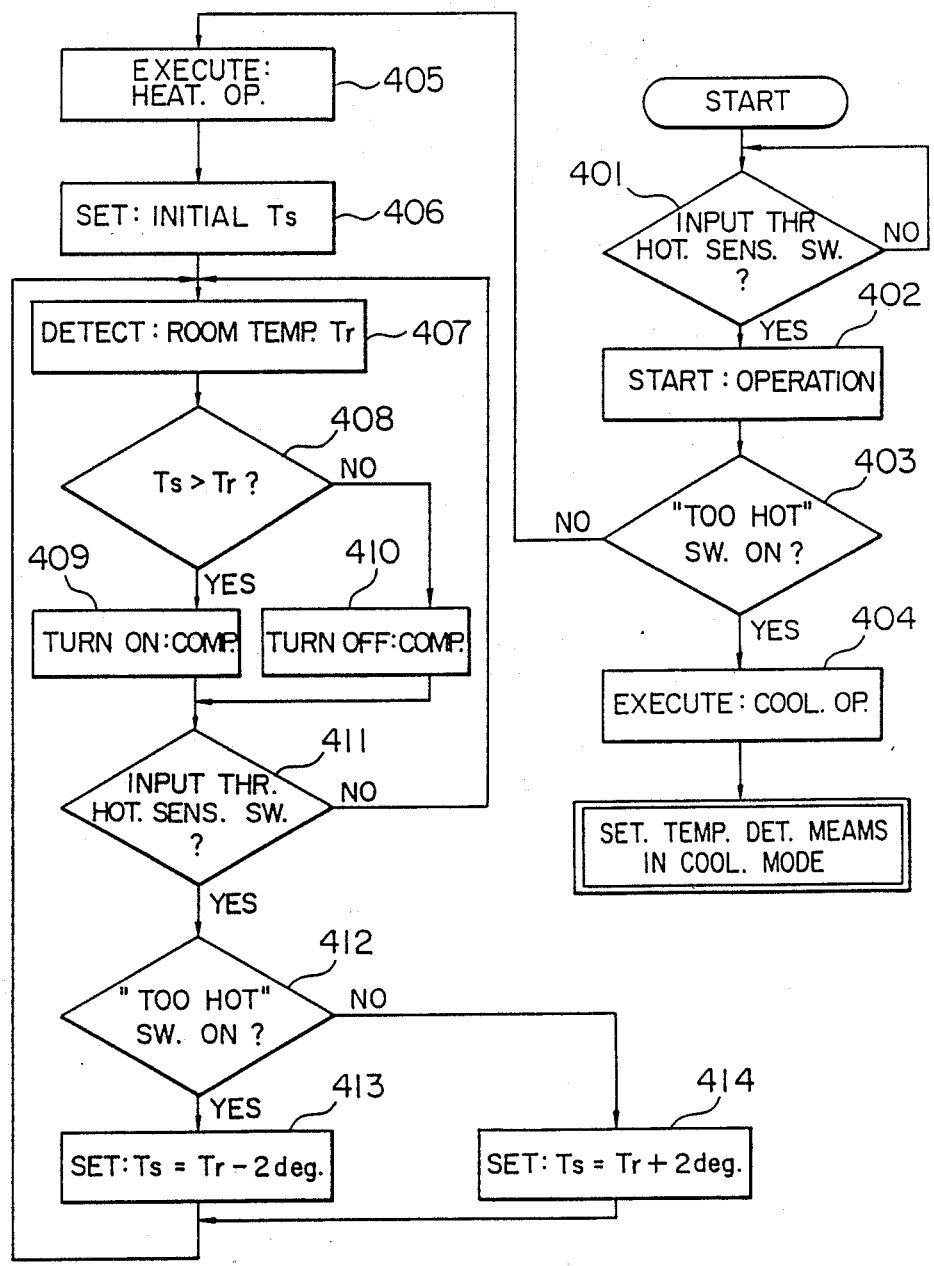
FIG. 15 is a flowchart showing the steps which are followed by the control device according to the third embodiment of this invention.
Figure 16:
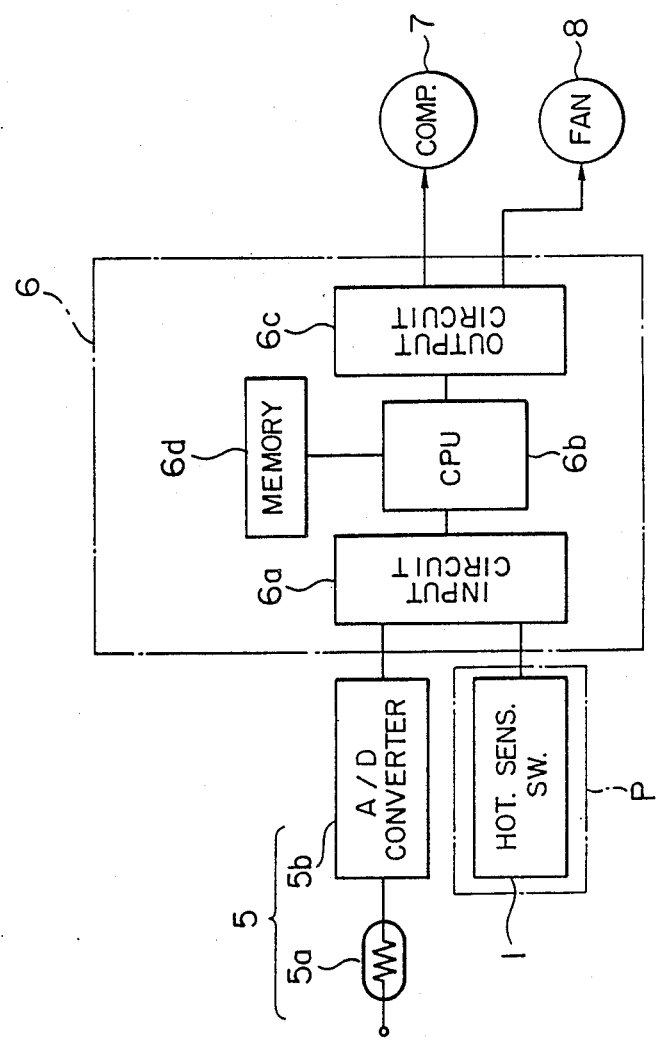
FIG. 16 is a view similar to that of FIG. 7 or 12, but showing the organization of a fourth embodiment of this invention.

Referring now to FIG. 15 of the drawings, the steps followed by the control device according to the third embodiment is described. When the air conditioner AC is at halt, the microcomputer or control device 6 is waiting for an input of a hotness sensation signal H/C through the switches 1, repeating determination of whether an input through hotness sensation switches 1 is present or not at step 401. When it is judged that a hotness sensation signal H/C is inputted, the operation start deciding means 10a decides to start the operation of the air conditioner AC. At the next step 403, further judgement is made as to which one of the switches 1, "too hot" switch 1a or "too cold" switch 1b, has been operated; if it is the "too hot" switch 1a that has been operated, mode selector means 10 determines to execute the cooling operation at step 404 and changes over the four-way valve accordingly, and the setting temperature determining means 11 determines the initial and later setting temperatures and performs the cooling operation (in a way analogous to that of the heating operation described below) so that the room temperature may approach the setting temperature. On the other hand, if it is judged at step 404 that the "too cold" switch 1b has been operated, steps 405 through 414 of the heating operation cycle are performed: at step 405, the execution of the heating operation is decided and the four-way valve is changed over to the position of the heating operation, and at step 406, the initial setting temperature Ts is set in a manner as described above; at steps 407 through 410, the current room temperature Tr is detected and the turning on and off of the compressor is controlled in such a way that the current room temperature Tr may approach the current setting temperature Ts; when it is judged, at step 411, that a further input through one of the hotness sensation switches 1, "too hot" switch 1a or "too cold" switch 1b, is present, the setting temperature Ts is renewed at steps 412 through 414 in a manner described above, so that the temperature of the room may be controlled to the level preferred by the user.

Fourth Embodiment

The organization and method of operation of a fourth embodiment according to this invention is similar to those of the third embodiment described above, except for the following point: the control device according to the fourth embodiment comprises a means for determining the rotational speed of the fan for delivering the air warmed or cooled by the air conditioner to the room. Thus, FIG. 16, which corresponds to FIG. 12 and is otherwise identical thereto, expressly shows the fan 8 driven by a signal from the output circuit 6c of the microcomputer 6; further, FIG. 17, which shows the functional organization of the control device (microcomputer) 6 of the fourth embodiment from a point of view corresponding to that of FIG. 14, shows fan speed determining means 15 of the control device 6, coupled to the output of the hotness sensation switches 1, as well as the fan 8 of the air conditioner AC. The speed of the fan 8 can be changed between fast and slow, as in the case of the conventional device shown in FIGS. 4 and 5.

Figure 17:
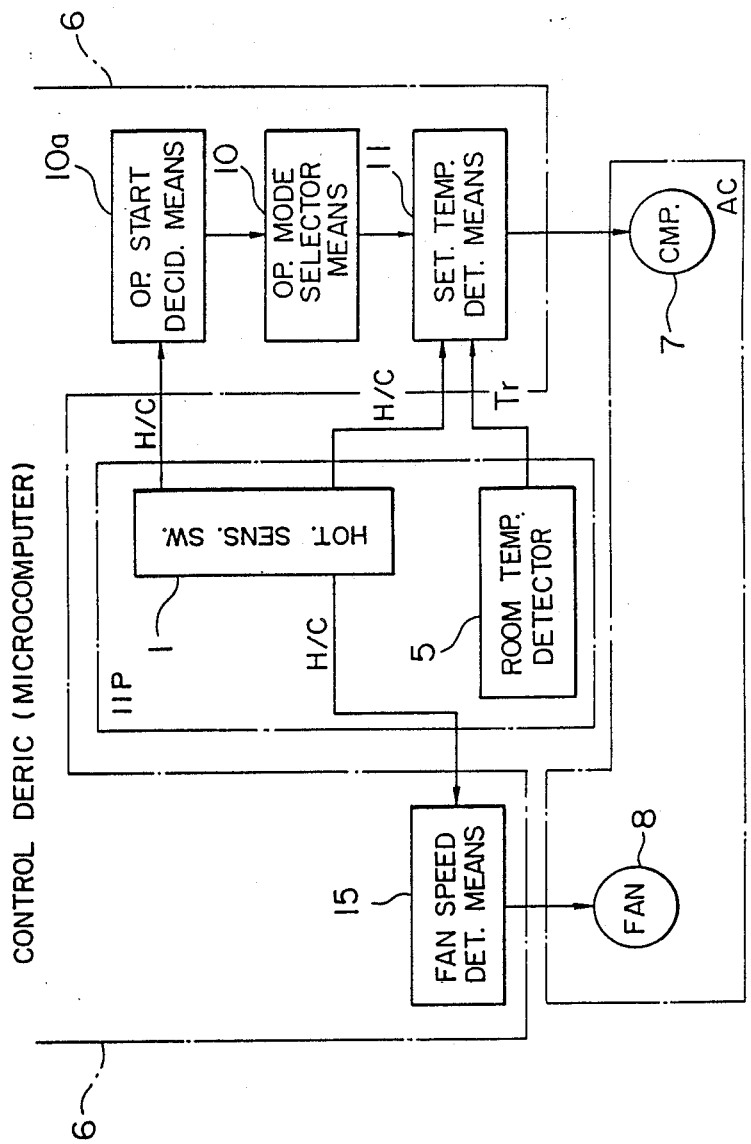
FIG. 17 is a view similar to that of FIG. 14, but showing a functional organization of the control device according to the fourth embodiment of this invention.

The fan speed determining means 15 shown in FIG. 17 determines the speed of the fan for delivering the warmed or cooled air to the room according to the number of times one of the hotness sensation switches 1 is operated during a predetermined length of time. More particularly, the means 15 first sets the fan speed at an initial predetermined speed, which may be fast or slow; thereafter, it adapts the fan speed, if necessary, to the preference of the user as follows: first it determines the number of times one of the hotness sensation switches 1 is operated by the user during a predetermined period of time, e.g., 5 seconds; next, it determines the appropriate fan speed on the basis of three pieces of information: first, the information on the current operation mode of the air conditioner, i.e., whether the air conditioner is in the heating or the cooling mode; second, the information as to the question: which one of the hotness sensation switches 1, "too hot" switch 1a or "too cold" switch 1b, has been operated; and third, the information on the number of times one of the hotness sensation switches 1 has been operated during said predetermined period of time. For example, if "too cold" switch 1b is operated two or more times during 5 seconds in the heating operation mode, the means 15 sets the fan speed at the fast level, judging that the user wants the room to be heated quickly. The actual steps which are followed by means 15 in determining the fan speed is described in detail below. Since the operations of the means or elements shown in FIGS. 16 and 17 other than the fan speed determining means 15 are identical to those of the corresponding means or elements of the third embodiment shown in FIGS. 12 and 14, descriptions thereof are omitted here, whereby like reference numerals represent like elements or means in corresponding figures.

Figure 18:
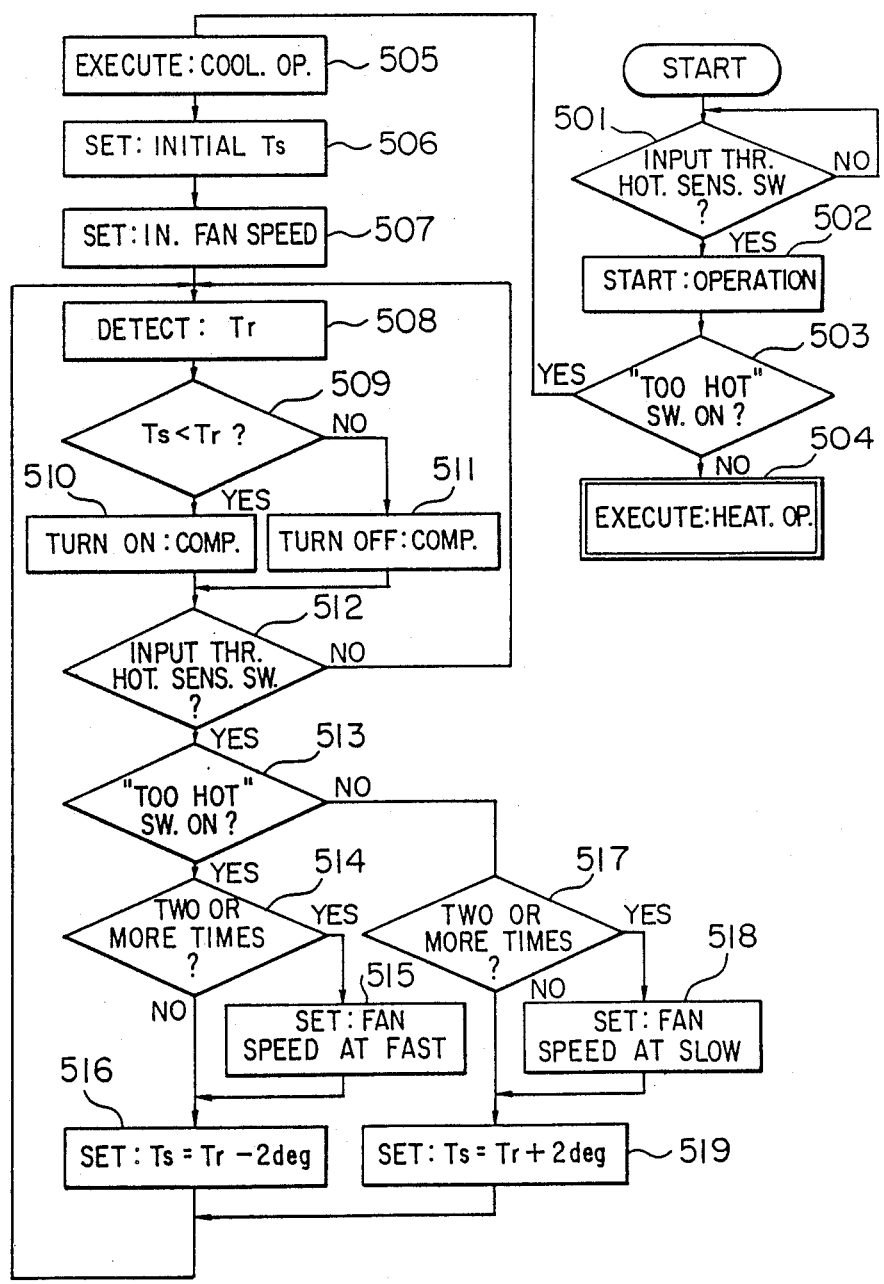
FIG. 18 is a flowchart showing the steps followed by the control device according to the fourth embodiment of this invention.

Referring now to the flowchart shown in FIG. 18, the steps followed by the control device 6 according to the fourth embodiment of this invention in controlling the air conditioner AC are described.

When the air conditioner AC is halted, the microcomputer or control device 6 is waiting for an input of a hotness sensation signal H/C through the switches 1, judging repeatedly at step 501 whether an input through hotness sensation switches 1 is present or not. When it is judged at step 501, that a hotness sensation signal H/C is inputted, the operation start deciding means 10a decides to start the operation of the air conditioner AC at step 502. At the next step 503, further judgement is made as to the question: which one of the switches 1, "too hot" switch 1a or "too cold" switch 1b, has been operated; if it is the "too cold" switch 1b that has been operated, mode selector means 10 determines to execute the heating operation at step 504 and changes over the four-way valve to the heating position, and the setting temperature determining means 11 determines the initial and later setting temperatures and performs the heating operation (in a way analogous to that of the cooling operation described below) so that the room temperature may approach the setting temperature.

On the other hand, when it is judged at step 503 that "too hot" switch 1a has been operated, steps 505 through 519 of the cooling operation cycle are performed. At step 505, the execution of the heating operation is decided and the four-way valve is changed over to the position of the cooling operation, and at step 506, the initial setting temperature Ts is set in a manner as described above. At steps 507, the fan speed is set at a predetermined initial speed. In the following sequence of steps 508 through 511, the current room temperature Tr is detected at step 508 and the turning on and off of the compressor is controlled at the subsequent steps in such a way that the current room temperature Tr may approach the current setting temperature Ts; namely, the compressor 7 is turned on when the room temperature Tr is higher than the setting temperature at step 510; otherwise it is turned off at step 511. These steps 508 through 511 are repeated until it is judged at step 512 that a further hotness sensation signal H/C is inputted through switches 1.

When it is judged, at step 512, that a further operation of one of the hotness sensation switches 1, "too hot" switch 1a or "too cold" switch 1b, has been made, the fan speed and the setting temperature Ts are renewed at steps 513 through 519. Namely, at step 513, judgement is made as to the question: which one of the hotness sensation switches 1 has been operated by the user. If it is the "too hot" switch 1a, steps 514 through 516 are followed to adapt the fan speed and the setting temperature to the preference of the user indicated by the operation of the "too hot" switch 1a: at step 514, the number of operations of the "too hot" switch 1a during 5 seconds id determined, and judgement is made whether or not "too hot" switch 1a has been operated two or more times during the same period of time; if the judgement at step 514 is in the affirmative, the fan speed is set to the fast speed at step 515 to maximize the amount of cool air delivered to the room, since it may be assumed that the user has operated the switch 1a many times during a short period of time because he or she has felt the need for a quick cooling of the room. If the judgement at step 514 is in the negative, the fan speed is not changed. Further, at step 516, irrespective of the number of operations of the "too hot" switch 1a, provided that the "too hot" switch 1a is operated at least once, the setting temperature Ts is set to a new level which is lower than the current room temperature Tr by two degrees centigrade, so that the level of Ts may represent the preference of hotness or coolness of the user. On the other hand, if it is judged at step 513 that "too cold" switch 1b has been operated, steps 517 through 519 are followed to adapt the fan speed and the setting temperature to the preference of the user indicated by the operation of the "too cold" switch 1b: at step 517, the number of operations of the "too cold" switch 1b during 5 seconds is determined, and judgement is made whether or not "too cold" switch 1b has been operated two or more times during the same period of time; if the judgement at step 517 is in the affirmative, the fan speed is set to the slow speed at step 518 to reduce the amount of cooled air delivered to the room, since it may be assumed that the user has operated the switch 1b many times during a short period of time because he or she has felt the need to reduce the intensitiy of the cooling operation. If the judgement at step 517 is in the negative, the fan speed is not changed. Further, at step 519, the setting temperature Ts is set to a new level which is higher than the current room temperature Tr by two degrees centigrade, so that the new level of Ts may represent the preference of hotness or coolness of the user. After the step 516 or 519, the control program returns to step 508 to repeat the above operation.

The steps of the heating operation followed after step 504 when it is judged at step 503 that "too cold" switch 1b has been operated are analogous to those of the cooling operation described above. The differences between them lie in the following points. Namely, the relationship between the sign of the error $\Delta T$ (defined by the equation: $\Delta T = Ts - Tr$) and the turning on and off of the compressor is reversed: in the heating operation, the compressor is turned on when the room temperature Tr is above the setting temperature Ts, and it is turned off when the room temperature Tr is equal to or below the setting temperature Ts. In addition the relationship between the kind of one of the hotness sensation switches 1 that has been operated by the user and the fan speed at which the fan is set when one of the hotness sensation switches 1 is operated two or more times during the predetermined period of time is reversed: in the heating operation, the fan speed is set at the slow speed when "too hot" switch 1a is operated repeatedly; it is set at the fast speed when "too cold" switch 1b is operated repeatedly. Since the steps of the heating operation is otherwise similar to those of the cooling operation described above, further description thereof is deemed unneccessary.

While description has been made of particular embodiments of this invention, it will be understood that many modifications may be made without departing from the spirit thereof. For example, although the control means of the above described embodiments effects ON/OFF control on the compressor of the air conditioner, this invention is applicable to the case in which the control of the compressor is based on the proportional or proportional-plus-integral control method; in such case, the output power of the compressor is controlled according to the value of the above described error or deviation of the room temperature with respect to the setting or target temperature, so that the error may be reduced. Thus, the appended claims are contemplated to cover any such modification as fall within the true spirit and scope of this invention.

What is claimed is:

1. A control device for an air conditioner which is capable of operating in a heating and a cooling operation mode, comprising:

hotness sensation input means for inputting sensations of hotness of a person in a room conditioned by the air conditioner;

mode selector means, coupled to said hotness sensation input means, for selecting an operation mode of the air conditioner from the heating and cooling operation modes thereof, in response to a first input of a sensation of hotness which is effected by said person through said hotness sensation input means for a first time in a period of time in which the air conditioner has been suspended;

room temperature detector means for detecting a temperature of a room conditioned by the air conditioner;

setting temperature determining means, coupled to said hotness sensation input means, for determining a setting temperature of the air conditioner in accordance with sensations of hotness inputted through said hotness sensation input means by said person in the room conditioned by the air conditioner;

error computation means, coupled to said room temperature detector means and said setting temperature determining means, for computing a deviation of the room temperature, detected by said room temperature detector means, from the setting temperature determined by said setting temperature determining means; and control means, coupled to said error computation means, for controlling an output of said air conditioner in accordance with said deviation of the room temperature from the setting temperature, computed by said error computation means, in such a way that said room temperature may approach said setting temperature, wherein said control means is activated in response to said first input of a sensation of hotness effected by said person; and wherein said hotness sensation input means comprises two switches: a first switch which is to be operated by said person when he feels that it is too hot in the room conditioned by the air conditioner, and a second which is to be operated by said person when he feels that it is too cold in the room conditioned by the air conditioner.

2. A control device for an air conditioner as claimed in claim 1, wherein said setting temperature determining means comprises:

setting temperature memory means for storing a last level Th of the setting temperature determined by said setting temperature determining means in a heating operation mode, and a last level Tc of the setting temperature determined by said setting temperature determining means in a cooling operation mode, wherein said last levels Th and Tc are renewed each time a new setting temperature is determined in a heating and a cooling operation mode, respectively;

wherein an initial setting temperature in a heating operation is determined on the basis of said last level Th in a heating operation mode stored in said setting temperature memory means, and an initial setting temperature in a cooling operation is determined on the basis of said last level Tc in a cooling operation mode stored in said setting temperature memory means.

3. A control device for an air conditioner as claimed in claim 2, wherein said initial setting temperature in a heating operation is determined on the basis of the room temperature detected by said room temperature detector means, as well as on said last level Th of the setting temperature in a heating operation, and said initial setting temperature in a cooling operation is determined on the basis of the room temperature detected by said room temperature detector means, as well as on said last level Tc of the setting temperature in a cooling operation.

4. A control device for an air conditioner as claimed in claim 1, wherein said setting temperature determining means comprises:

setting temperature memory means for storing a predetermined fixed level Th of an initial setting temperature in a heating operation mode, and a predetermined fixed level Tc of an initial setting temperature in a cooling operation mode;

wherein an initial setting temperature in a heating operation is determined at said fixed level Th of the initial setting temperature in a heating operation, and an initial setting temperature in a cooling operation is determined at said fixed level Tc of the initial setting temperature in a cooling operation.

5. A control device for an air conditioner as claimed in claim 1, wherein said setting temperature determining means renews a level of said setting temperature each time a sensation of hotness is inputted through said hotness sensation input means by said person in the room conditioned by the air conditioner.

6. A control device for an air conditioner as claimed in claim 1, wherein said setting temperature determining means renews a level of said setting temperature each time a sensation of hotness is inputted through said hotness sensation input means by said person in the room conditioned by the air conditioner.

7. A control device for an air conditioner as claimed in claim 6, wherein said setting temperature determining means sets a new level of said setting temperature at a level which is higher than a room temperature currently detected by said temperature detector means by a predetermined number of degrees, when said second switch of the hotness sensation input means is operated by said person in the room conditioned by the air conditioner, and at a level which is lower than said room temperature currently detected by said temperature detector means by a predetermined number of degrees, when said first switch is operated by said person in the room conditioned by the air conditioner.

8. A control device for an air conditioner as claimed in claim 6, wherein said setting temperature determining means sets a new level of said setting temperature at a level which is higher than a current level thereof by a predetermined number of degrees, when said second switch of the hotness sensation input means is operated by said person in the room conditioned by the air conditioner, and at a level which is lower than a current level thereof by a predetermined number of degrees, when said first switch is operated by said person in the room conditioned by the air conditioner.

9. A control device for an air conditioner as claimed in claim 7 or 8, wherein said predetermined number of degrees is two degrees centigrade.

10. A control device for an air conditioner as claimed in claim 1, further comprising fan speed determining means, coupled to said hotness sensation input means, for determining a rotational speed of a fan for delivering conditioned air to said room, in accordance with a number of inputs of sensations of hotness which are made by said person during a predetermined length of time.

11. A control device for an air conditioner as claimed in claim 10, wherein said fan speed determining means renews the rotational speed of the fan, when two or more inputs of a sensation of hotness is effected by the person in the room conditioned by the air conditioner, during a period of 5 seconds.

12. A control device for an air conditioner as claimed in claim 1, wherein said control means turns on and off a compressor of the air conditioner according to a value of said deviation of the room temperature from the setting temperature.

13. A control device for an air conditioner as claimed in claim 1, further comprising an operation start deciding means, coupled to said hotness sensation input means, for deciding to start an operation of the air conditioner in response to a first input of a sensation of hotness which is effected by said person through said hotness sensation input means for a first time in a period of time in which the air conditioner has been halted, said control means starting a control of the air conditioner in response to a decision of said operation start deciding means to start an operation of the air conditioner.

* * * * *